Oct. 8, 1940.                F. CONRAD                 2,217,471
        AUOMOBILE BATTERY CHARGING SYSTEM AND FLAT RECTIFIER THEREFOR
                    Filed Dec. 22, 1938           2 Sheets-Sheet 1
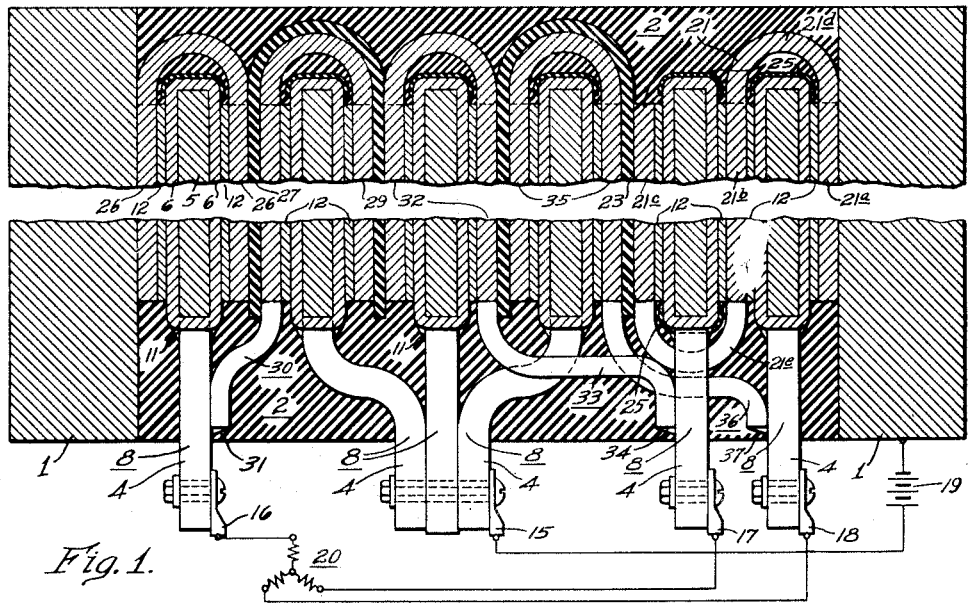
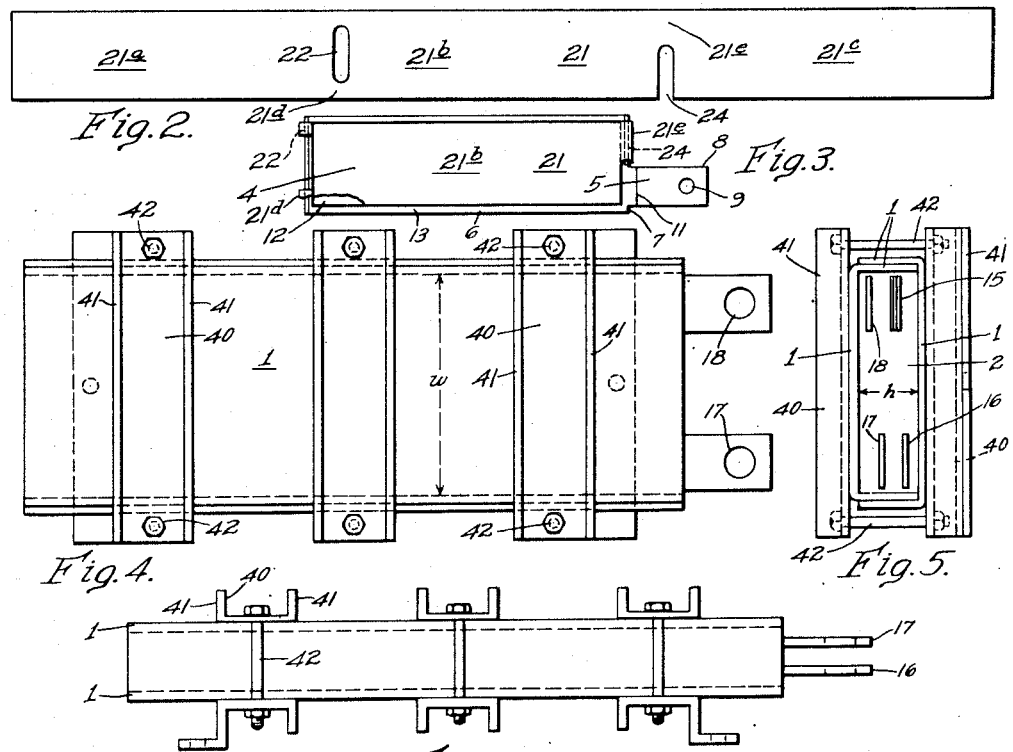
WITNESSES:                                          INVENTOR
                                                  Frank Conrad.
                                              BY
                                                    ATTORNEY Oct. 8, 1940.    F. CONRAD    2,217,471
AUOMOBILE BATTERY CHARGING SYSTEM AND FLAT RECTIFIER THEREFOR
Filed Dec. 22, 1938    2 Sheets-Sheet 2

WITNESSES:
C. J. Weller.
Rev. C. Groome

INVENTOR
Frank Conrad.
BY O. D. Buchanan
ATTORNEY

Patented Oct. 8, 1940

2,217,471

UNITED STATES PATENT OFFICE 2,217,471

AUTOMOBILE BATTERY CHARGING SYSTEM AND FLAT RECTIFIER THEREFOR

Frank Conrad, Wilkinsburg, Pa., assignor to Westinghouse Electric & Manufacturing Company, East Pittsburgh, Pa., a corporation of Pennsylvania Application December 22, 1938, Serial No. 247,193

14 Claims. (Cl. 175—366)

My present invention relates to automobile battery charging systems of the general type shown in the Conrad and Goode Patent No. 2,117,018, granted May 10, 1938.

More specifically, my present invention relates to improvements in the construction and location of a flat contact-rectifier for use in such a battery charging system for automobiles.

An object of the invention is to provide a novel battery charging system for automobiles, in which the flat rectifier is disposed in a novel location on the automobile, making possible the operation of the rectifier at a lower temperature than is known to be possible with any other location for the rectifier.

Another object of the invention is to provide a novel channel-member housing-construction for the rectifier.

More specifically, an object of the invention is to provide a water-proof rectifier-unit having channel-member attachments for combining the functions of clamping means and heat-radiating fins, characterized by flat contacting surfaces which are initially bowed so that, when the clamping pressure is applied, they will be put under strain and straightened out into a substantially flat surface, making the best heat-conducting relation to the rectifier-stack or unit.

A further object of the invention is to provide a novel structure and arrangement of the various elements in a flat contact-rectifier assembly.

In some of its aspects, my invention relates to a flat rectifier assembly which is an improvement over that which is shown and described in my Patent No. 2,117,020, granted May 10, 1938.

With the foregoing and other objects in view, my invention consists in the combinations, systems, methods and apparatus hereinafter described and claimed, and illustrated in the accompanying drawings, wherein:

Figure 1 is an enlarged sectional view, which is necessarily somewhat schematic in nature, representing a cross-section through my flat contact-rectifier assembly, with some of the thinner parts somewhat disproportionately exaggerated in thickness, for convenience in illustration, and also illustrating suitable circuit-connections for the rectifier;

Fig. 2 is a plan view of a lead connection-sheet utilized in the rectifier-assembly;

Fig. 3 is a plan view of one of the rectifier-cells, with parts broken away to show the construction;

Figs. 4, 5 and 6 are respectively plan, side and elevational views showing a complete rectifier-assembly when constructed in accordance with one form of embodiment of my invention;

Figure 7:
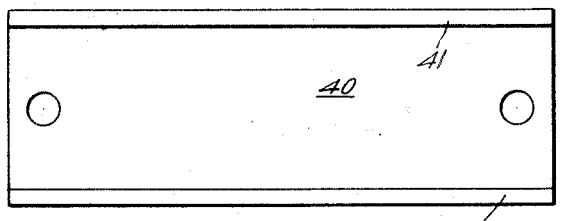
Figs. 7, 8 and 9 are respectively plan, end and side elevational views of one of the channel members shown in Figs. 4, 5 and 6.

My invention relates particularly to a flat contact-rectifier assembly in a water-proof construction in which the active rectifier-elements are stacked in a low, compact, flat stack which is very much shorter, in height $h$, than in width $w$, the whole being enclosed in a metallic cell 1 which is open at both ends, both ends being filled with water-proof insulating material 2. The metal cell 1 may conveniently be formed of two telescoping channel members, as indicated in Fig. 5, said channel members being assembled together in any convenient manner, making a water-proof joint along the telescoping sides. The flat base-portions of the two channel members of the metal cell 1 constitute rigid metal terminal pressure-plates for the contact-rectifier assembly.

My contact-rectifier assembly is illustrated in the form of a polyphase rectifier comprising twice as many rectifier-cells 4 as there are phases, a three-phase construction being illustrated. Each cell 4 has, at its center, an intermediate sheet 5 and two outer-sheets 6. In a preferred form of embodiment of my invention, the intermediate sheet 5 is of copper and the two outer-sheets 6 are composed of a coating of red copper-oxide formed on the mother copper 5.

As shown in Fig. 3, each cell 4 has an oxidized copper blank having a rectangular body-portion 7 and an end-tab 8, which may be provided with a perforation 9. The blank is oxidized to provide the oxide coating 6 which is ground away from the end-tab, as indicated at 11, exposing the mother copper 5 of the end-tab 8. The surfaces of the two red-oxide coatings 6 of each copper plate 5 are coated with a smooth-surfaced conducting coating 12 (Figs. 1 and 3), of a finely divided conducting material, covering all but a narrow marginal rim 13 (Fig. 3) of each oxidized surface, which marginal rim may be of a width of the order of one-eighth of an inch, shown somewhat exaggerated in Fig. 3 for convenience in illustration. The conducting coating may conveniently be applied in the form of finely divided conducting material suspended in a liquid vehicle, by liquid vehicle meaning to include a paste as well as a liquid. A convenient coating for this purpose is a suspension of finely divided carbon or graphite in water.

The purpose of the carbon coating 12 is to provide a good electrical contacting surface for the oxide coatings 6. The purpose of the rim is to reduce electric current-leakage in the negative or non-conducting direction, minimizing leakage around the sides or ends of the oxidized copper plate and also avoiding making any effective utilization of the extreme edges of the oxidized surfaces, said edges being commonly of poorer rectifying properties than the rest of the surface.

An intermediate group of three of the six cells 4 are grouped together with their terminal tabs 8 joined together to constitute the positive terminal 15 (Fig. 1) of the rectifier-assembly. The terminal tabs 8 of the other three rectifier-cells 4 constitute the three polyphase terminals 16, 17 and 18 of the rectifier-assembly. The negative terminal of the rectifier-assembly is provided by the metal casing 1.

Fig. 1 shows the rectifier-assembly as being utilized to charge a storage battery 19, which is connected between the negative rectifier-terminal 1 and the positive rectifier-terminal 15, while the three alternating-current terminals 16, 17 and 18 are energized from a polyphase source 20.

From Fig. 1 it will be noted that the two cells having the alternating-current terminals 17 and 18 are associated with a single continuous flexible connecting-sheet 21, which is formed of a metallic material other than copper. In a preferred form of my invention, this connecting-sheet is of a thin sheet or foil of lead, which has one portion 21ᵃ lying between the right-hand terminal end-plate 1 and the right-hand carbon coating 12 on the cell 4 which has the alternating-current terminal 18.

An intermediate portion 21ᵇ of the connecting-sheet 21 is disposed between the adjacent carbon coatings 12 of the two adjacent cells 4 having the terminals 17 and 18. It will be observed that the flexible lead connecting-sheet 21 is bent at the portion 21ᵈ between the portions 21ᵃ and 21ᵇ, the bent portion 21ᵈ being provided with a slit 22, as indicated in Fig. 2, to facilitate the bending.

The flexible connection-sheet 21 is also provided with a third portion 21ᶜ which lies between the coating 12 on the left-hand side of the cell 4 having the alternating-current terminal 17 and a sheet of paper 23 or other insulation which is provided around the next adjacent cell 4, toward the center of the stack. Between the portions 21ᵇ and 21ᶜ, where the flexible connection-sheet 21 is bent, as indicated at 21ᵉ, said sheet is provided with a second slit 24. This second slit 24 is disposed at one edge of the connecting-sheet 21 so that it will clear the terminal tab 8 of the copper plate which is provided with the alternating-current terminal 17, so as to avoid electrical contact between said tab 8 and said connecting-sheet.

In order to avoid any danger of unintentional or accidental contact between the uncoated ends of the copper-oxide layers 6 and the lead connecting-sheet 21, these ends may be protected by little pieces of thin insulating tape, as indicated at 25 in Fig. 1.

At the left-hand end of the stack, as shown in Fig. 1, the two carbon coatings 12 of the cell 4 having the alternating-current terminal 16 are joined to each other, and to the left-hand terminal plate 1, by means of a folded-over lead connecting-sheet 26, which is insulated from the next adjacent cell of the stack by means of a piece of paper 27 or other insulation.

The group of three intermediate cells 4 which have their tabs connected together to provide the positive direct-current terminal 15 of the rectifier are separated, by the folded-over sheets of paper 23 and 27, into three insulated units, that is, units having their negative terminals insulated from each other and from other portions of the rectifier stack. The left-hand cell 4 of this intermediate group of three has its two carbon coatings 12 in engagement with a flexible lead connection-sheet 29 which is provided with a tab 30 which is bent over and connected to the tab 8 of the cell having the alternating-current terminal 16, as indicated by the solder connection 31. In like manner, the second of the three intermediate cells 4 is provided with a lead connecting-sheet 32 having a terminal tab 33 which is soldered at 34 to the tab 8 of the cell having the alternating-current terminal 17. In like manner, the third of the intermediate group of cells 4 is provided with a lead connecting-sheet 35 having a terminal tab 36 which is soldered at 37 to the terminal tab 8 of the cell having the alternating-current terminal 18.

Reference to Fig. 5 will show that the terminal tabs constituting the terminals 16 and 17 are toward the front, while the terminal tabs constituting the terminals 15 and 18 are toward the rear, so that the above-described connections may be made without interfering with each other.

In a rectifier-unit or assembly constructed as above described, it is necessary for the major portion of the heat to flow axially of the stack, along the small thickness or height $h$ thereof, that is, from the center of the rectifier-assembly out toward the two terminal end-plates 1, as shown in Fig. 1. It is necessary or desirable, therefore, for the heat to be effectively conducted away from these terminal end-plates 1, and at the same time it is necessary or desirable for these terminal end-plates 1 to be clamped together with a reasonably strong pressure in order to make a good electrical contact between the electrically contacting parts of the assembly.

As shown in Figs. 4 to 6, I provide a plurality of channel members 40 for at once providing the heat-radiating fins 41 for conducting heat away from the terminal end-plates 1 and for clamping the two end-plates together by means of clamping-bolts 42. These channel members 40 extend across the breadth of the terminal end-plates 1, and are longer than said breadth so that the bolts 42 can be engaged through the overhanging ends of the channel members, to draw said channel members together in pairs, it being understood that said channel members are provided on both ends of the rectifier-stack.

Figure 8:
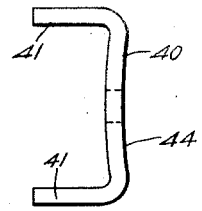
Figure 9:
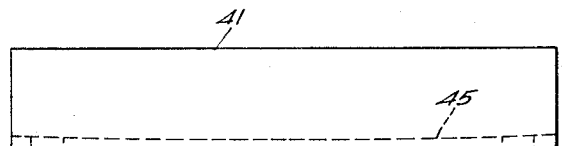

According to a preferred method of construction according to my invention, the channel members 40 are of a novel construction, as shown more in detail in Figs. 7 to 9, wherein the flat or bight portion of the channel members are initially bowed, both transversely, as shown at 44 in Fig. 8, and longitudinally, as shown at 45 in Fig. 9, so that when the clamping-bolts 42 are tightened, applying pressure to the channel members 40, these initially bowed surfaces will be straightened out into a substantially flat surface engaging against the end pressure-plates 1 of the rectifier-assembly. The object in having the aforesaid bowed curvatures 44 and 45 is two-fold, namely, to cause the channel members 40 to exert a more uniform pressure on the terminal clamping plates 1, which is good for the rectifier-operation, and also to provide the broadest possible area of thermal or heat-conducting contact between the bights of the channel members 40 and the respective metal terminal plates 1, which is necessary in order to obtain a good heat-flow from the terminal plates 1 to the heat-radiating fins 41 of the channel members 40.

Figure 10:
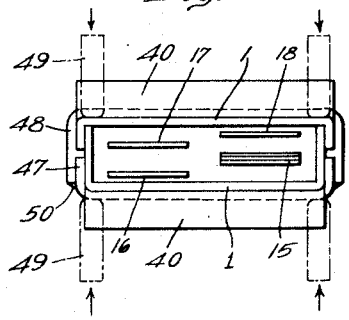
Fig. 10 is an end view of a modified construction of flat rectifier-assembly.

A modified form of construction of the clamping means is shown in Fig. 10, wherein the bolts 42 are omitted, but the ends of the bights of the channel members 40 are bent down, as indicated at 47 and 48. These two ends 47 and 48 are bent into telescoping relation at each end of the channel members 40. The assembly is first pressed together in a press 49 which is diagrammatically illustrated by construction lines, after which the telescoping bent ends 47 and 48 may be permanently joined together by a spot of welding 50. The channel members 40 may have their bight portions initially curved as indicated at 45 in Fig. 9, in order that they may exert a more uniform pressure on the end-plates 1, while at the same time making a better thermal contact therewith.

It will be perceived, from the foregoing description, that the matter of a ready heat-flow, with small temperature-drops, is a matter of considerable importance in the rectifier-operation. The matter of rectifier-temperatures must be carefully guarded, so as to preferably permit the rectifier to operate at a lower temperature than can be found anywhere on an automobile except at the extreme front of the automobile. Tests have indicated that all other portions of the automobile are hotter than is desirable for the operation of the rectifier.

Figure 11:
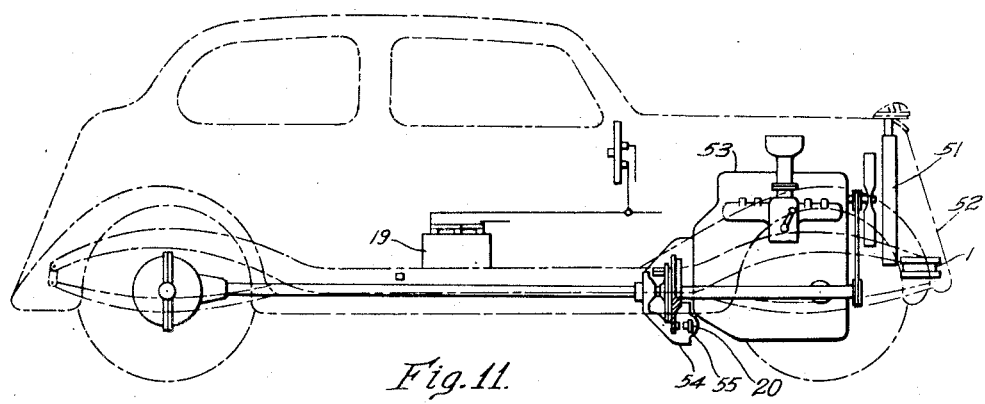
Fig. 11 is a side view of an automobile embodying my invention and showing the preferred location of my flat rectifier-assembly, certain of the conventional automobile-parts being indicated in phantom or dot-and-dash lines for convenience in illustration.

In Fig. 11 I have illustrated the preferred location of my rectifier-assembly 1 at the front end of an automobile, in a position in front of the plane of the radiator 51, and back of the ornamental grille 52 with which automobiles are commonly provided. The particular automobile illustrated is of the common type having an engine or prime-mover 53 located at the front end of the automobile, immediately behind the radiator 51. The illustrated automobile also has a clutch-housing 54 provided with a protuberance or enlargement 55 housing a polyphase generator 20. The storage battery 19 may be placed in any usual location as indicated in Fig. 11. The wiring connections are as shown in Fig. 1.

While I have described and illustrated my invention in two different forms of embodiment, and have indicated a preferred structure and method of carrying out the invention, it will be obvious that various changes in detail may be resorted to by those skilled in the art, while still retaining some of the novel features and advantages of my invention. I desire, therefore, that the appended claims shall be accorded the broadest construction consistent with their language and the prior art.

I claim as my invention:

1. A flat contact-rectifier assembly comprising a low flat stack comprising a plurality of plate-like contact-rectifier cells, a waterproof enclosure therefor including rigid metal terminal pressure-plates and insulating waterproofing material for completely protecting the rectifier-cells against the entrance of moisture, and a plurality of rigid metal channel-members having the flat sides of their bight-portions in intimate heat-conducting engagement with the flat side of at least one of the terminal pressure-plates.

2. A flat contact-rectifier assembly comprising a low flat stack comprising a plurality of plate-like contact-rectifier cells, a waterproof enclosure therefor including rigid metal terminal pressure-plates and insulating waterproofing material for completely protecting the rectifier-cells against the entrance of moisture, a plurality of rigid metal channel-members having the flat sides of their bight-portions in intimate heat-conducting engagement with the flat side of each terminal pressure-plate, said flat stack and the terminal pressure-plates therefor having a length greater than their breadth and said channel-members extending across the breadth of said terminal pressure-plates and being longer than said breadth, and clamping-means joining the ends of said channel-members in pairs for pressing said stack between said terminal pressure-plates.

3. The invention as defined in claim 2, characterized by the bights of said channel-members being initially bowed in a manner to be put under a strain and to be straightened out into a substantially flat surface when the clamping pressure is applied by said clamping-means.

4. A flat contact-rectifier assembly comprising a low flat stack comprising a plurality of plate-like contact-rectifier cells, a waterproof enclosure therefor including terminal pressure-plates and insulating waterproofing material for completely protecting the rectifier-cells against the entrance of moisture, and means for clamping said stack under a fairly uniform pressure, said clamping-means including a rigid pressure-surface portion which is initially bowed in a manner to be put under a strain and to be straightened out into a substantially flat surface when the clamping pressure is applied.

5. A flat contact-rectifier assembly comprising a low flat stack comprising a plurality of plate-like contact-rectifier cells, a waterproof enclosure therefor including two rigid metal channel-members having inwardly directed, telescoping sides forming an open-ended enclosure-box, said waterproof enclosure also including insulating waterproofing material for completely protecting the rectifier-cells against the entrance of moisture, and means for joining the respective sides of one channel-member to the corresponding telescoping sides of the other channel-member in such manner as to hold said stack in compression, the bights of said channel members being initially bowed in a manner to be put under a strain and to be straightened out into a substantially flat surface when the clamping pressure is applied to said stack.

6. A polyphase copper-oxide rectifier-assembly comprising a low flat stack comprising twice as many copper plates as there are phases, each plate being oxidized on both sides and having a terminal-tab free of oxide, half of the total number of plates being compactly grouped together, in an intermediate portion of the stack, and having their terminal-tabs joined together to constitute the positive terminal of the rectifier-assembly, thin sheets of insulating material being disposed in insulating relation to the oxidized surfaces of each of said positive-terminal copper plates so as to electrically insulate each oxidized surface of each of said positive-terminal copper plates from the next adjacent element of the stack, the remaining copper plates of the stack having their respective terminal-tabs constituting the polyphase terminals of the rectifier-assembly, means for electrically connecting the oxidized surfaces of said remaining copper plates to constitute the negative terminal of the rectifier-assembly, and means for connecting both oxidized surfaces of each one of the positive-terminal copper plates to a separate one of the polyphase terminals.

7. A copper-oxide rectifier-assembly comprising a low flat stack comprising a plurality of copper plates, each plate being oxidized on both sides and having a terminal-tab free of oxide, half of the total number of plates being compactly grouped together, in an intermediate portion of the stack, and having their terminal-tabs joined together to constitute the positive terminal of the rectifier-assembly, thin sheets of insulating material being disposed in insulating relation to the oxidized surfaces of each of said positive-terminal copper plates so as to electrically insulate each oxidized surface of each of said positive-terminal copper plates from the next adjacent element of the stack, the remaining copper plates of the stack having their respective terminal-tabs constituting the alternating-current terminals of the rectifier-assembly, means for electrically connecting the oxidized surfaces of said remaining copper plates to constitute the negative terminal of the rectifier-assembly, and means for connecting both oxidized surfaces of each one of the positive-terminal copper plates to a separate one of the alternating-current terminals.

8. A flat polyphase contact-rectifier assembly comprising a low flat stack comprising twice as many plate-like contact rectifier cells as there are phases, each cell comprising an intermediate sheet and two outer-sheets, the two outer-sheets being operatively disposed, one on each side of the associated intermediate sheet, and the intermediate sheet having a terminal-tab, half of the total number of cells being compactly grouped together, in an intermediate portion of the stack, and having their terminal-tabs joined together to constitute one direct-current terminal of the rectifier-assembly, the remaining cells of the stack having their respective terminal-tabs constituting the polyphase alternating-current terminals of the rectifier-assembly, contact-layer means for electrically connecting the outer-sheets of said remaining cells to constitute the other direct-current terminal of the rectifier-assembly, contact-layer means for connecting both outer-sheets of each one of said intermediate group of cells to a separate one of the polyphase terminals, and thin sheets of insulating material so disposed as to electrically insulate the contact-layer means of each outer-sheet of each one of said intermediate group of cells from the next adjacent element of the stack.

9. A flat contact-rectifier assembly comprising a low flat stack comprising a plurality of plate-like contact-rectifier cells, each cell comprising an intermediate sheet and two outer-sheets, the two outer-sheets being operatively disposed, one on each side of the associated intermediate sheet, and the intermediate sheet having a terminal-tab, half of the total number of cells being compactly grouped together, in an intermediate portion of the stack, and having their terminal-tabs joined together to constitute one direct-current terminal of the rectifier-assembly, the remaining cells of the stack having their respective terminal-tabs constituting the alternating-current terminals of the rectifier-assembly, contact-layer means for electrically connecting the outer-sheets of said remaining cells to constitute the other direct-current terminal of the rectifier-assembly, contact-layer means for connecting both outer-sheets of each one of said intermediate group of cells to a separate one of the alternating-current terminals, and thin sheets of insulating material so disposed as to electrically insulate the contact-layer means of each outer-sheet of each one of said intermediate group of cells from the next adjacent element of the stack.

10. A flat copper-oxide rectifier-assembly comprising a low flat stack comprising a plurality of copper plates, each plate being oxidized on both sides and having a terminal-tab free of oxide, a smooth-surfaced conducting coating of finely divided material covering all but a narrow marginal rim of each oxidized surface, insulating sheets between successive electrically insulated parts of said rectifier-assembly, and a plurality of surface-to-surface connection-means, some of said surface-to-surface connection-means comprising a flexible connecting-sheet of metallic material softer than copper, each of said connecting-sheets having a portion disposed flatwise in engagement with one of said smooth-surfaced conducting coatings and another portion bent into another plane for engagement with an axially displaced member of said stack.

11. A flat copper-oxide rectifier-assembly comprising a low flat stack comprising a plurality of copper plates, each plate being oxidized on both sides and having a terminal-tab free of oxide, a smooth-surfaced conducting coating of finely divided material covering all but a narrow marginal rim of each oxidized surface, insulating sheets between successive electrically insulated parts of said rectifier-assembly, and a plurality of surface-to-surface connection-means, some of said surface-to-surface connection-means comprising a flexible connecting-sheet of metallic material softer than copper, each of said connecting-sheets having a portion disposed flatwise in engagement with one of said smooth-surfaced conducting coatings and another portion bent around the same oxidized copper plate into engagement with the smooth-surfaced conducting coating on the other side of said plate.

12. A flat copper-oxide rectifier-assembly comprising a low flat stack comprising a plurality of copper plates, each plate being oxidized on both sides and having a terminal-tab free of oxide, insulating sheets between successive electrically insulated parts of said rectifier-assembly, and a plurality of surface-to-surface connection-means, some of said surface-to-surface connection-means comprising a flexible connecting-sheet of metallic material softer than copper, each of said connecting-sheets having a portion disposed flatwise in electrical connection with an oxidized surface of one of said copper plates, and another portion having a slit therein and bent around the same plate into electrical connection with the other oxidized surface thereof.

13. A flat polyphase contact-rectifier assembly comprising a low flat stack comprising twice as many plate-like contact-rectifier cells as there are phases, a waterproof enclosure therefor including rigid metal terminal pressure-plates and insulating waterproofing material for completely protecting the rectifier-cells against the entrance of moisture, each cell comprising an intermediate sheet and two outer-sheets, the two outer-sheets being operatively disposed, one on each side of the associated intermediate sheet, and the intermediate sheet having a terminal-tab, half of the total number of cells being compactly grouped together, in an intermediate portion of the stack, and having their terminal-tabs joined together to constitute one direct-current terminal of the rectifier-assembly, the remaining cells of the stack having their respective terminal-tabs constituting the polyphase terminals of the rectifier-assembly, a single continuous flexible connecting-sheet of metallic material softer than copper at each end of the stack, each of said connecting-sheets being folded so as to have separate portions disposed flatwise in electrical connections respectively, with the inner surface of the corresponding one of said terminal pressure-plates and with all of the rectifier-cell outer-sheets between said pressure-plate and the intermediate group of rectifier-cells, exclusive of the latter, a single continuous flexible connecting-sheet of metallic material softer than copper associated with each rectifier-cell of the intermediate group, each of said last-mentioned connecting-sheets being folded so as to have separate portions disposed flatwise in electrical connections with the two outer-sheets of its associated intermediate rectifier-cell, and also having a bent tab in electrical connection with a separate one of the polyphase terminals, and thin sheets of insulating material so disposed as to electrically insulate each of said last-mentioned connecting-sheets from the next adjacent element of the stack.

14. A flat contact-rectifier assembly comprising a low flat stack comprising a plurality of plate-like contact-rectifier cells, a waterproof enclosure therefor including rigid metal terminal pressure-plates, and insulating waterproofing material for completely protecting the rectifier-cells against the entrance of moisture, each cell comprising an intermediate sheet and two outer-sheets, the two outer-sheets being operatively disposed, one on each side of the associated intermediate sheet, and the intermediate sheet having a terminal-tab, half of the total number of cells being compactly grouped together, in an intermediate portion of the stack, and having their terminal-tabs joined together to constitute one direct-current terminal of the rectifier-assembly, the remaining cells of the stack having their respective terminal-tabs constituting the alternating-current terminals of the rectifier-assembly, a single continuous flexible connecting-sheet of metallic material softer than copper at each end of the stack, each of said connecting-sheets being folded so as to have separate portions disposed flatwise in electrical connections, respectively, with the inner surface of the corresponding one of said terminal pressure-plates and with all of the rectifier-cell outer-sheets between said pressure-plate and the intermediate group of rectifier-cells, exclusive of the latter, and a single continuous flexible connecting-sheet of metallic material softer than copper associated with each rectifier-cell of the intermediate group, each of said last-mentioned connecting-sheets being folded so as to have separate portions disposed flatwise in electrical connections with the two outer-sheets of its associated intermediate rectifier-cell, and also having a bent tab in electrical connection with a separate one of the alternating-current terminals, and thin sheets of insulating material so disposed as to electrically insulate each of said last-mentioned connecting-sheets from the next adjacent element of the stack.

FRANK CONRAD.